Nov. 20, 1956   G. M. SAVAGE   2,771,399
PROCESS AND APPARATUS FOR DETERMINING BIOLOGICAL
POTENCY OF A SUBSTANCE IN A LIQUID SUBSTRATE
Filed Oct. 12, 1954   3 Sheets-Sheet 1
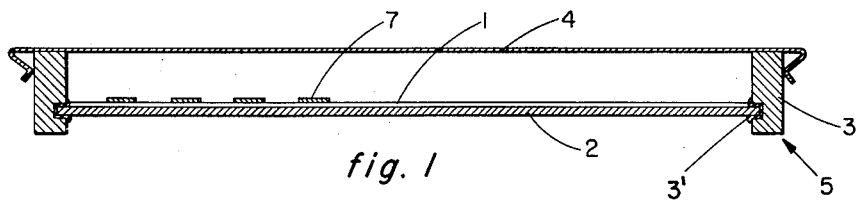
fig. 1
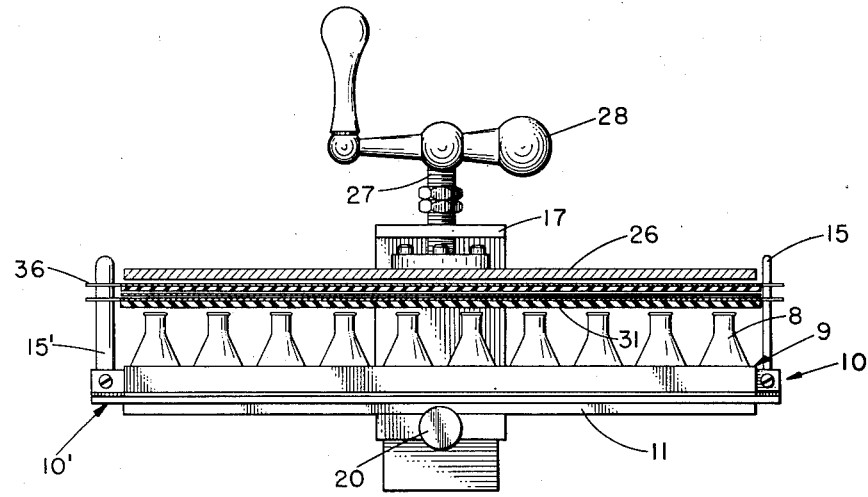
fig. 2
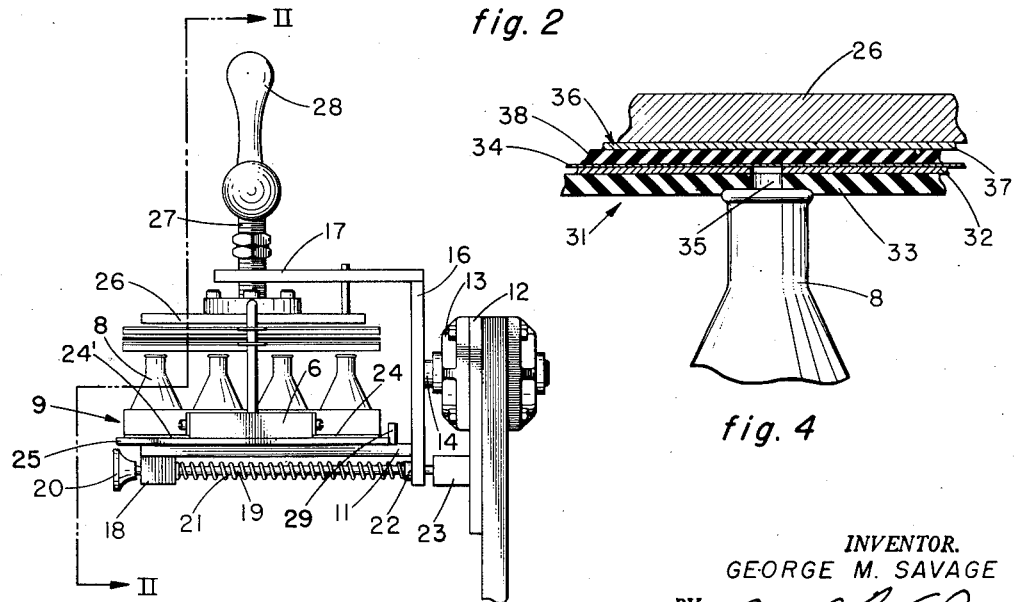
fig. 3
fig. 4
INVENTOR.
GEORGE M. SAVAGE
BY
ATTORNEY Nov. 20, 1956 G. M. SAVAGE 2,771,399
PROCESS AND APPARATUS FOR DETERMINING BIOLOGICAL
POTENCY OF A SUBSTANCE IN A LIQUID SUBSTRATE
Filed Oct. 12, 1954 3 Sheets-Sheet 2
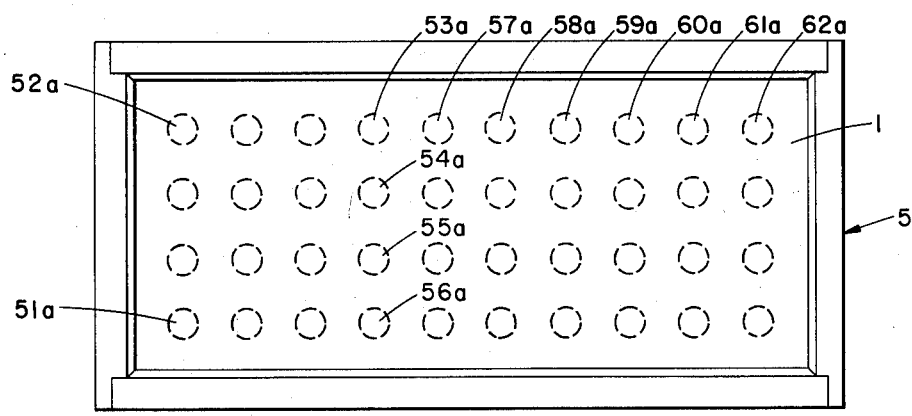
fig. 5
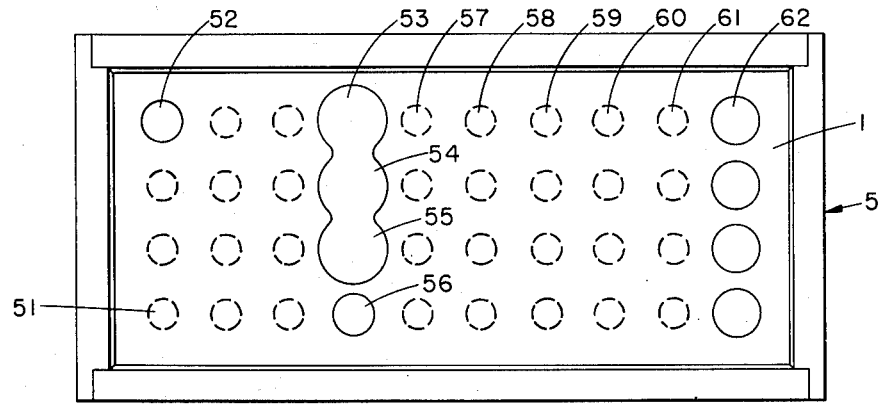
fig. 6
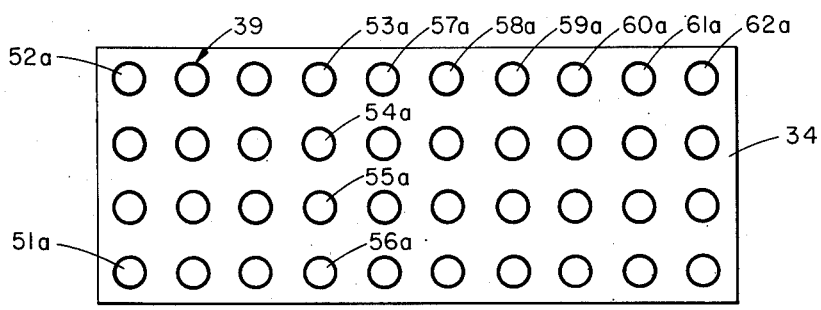
fig. 7
INVENTOR.
GEORGE M. SAVAGE
BY 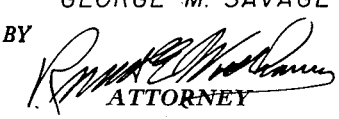
ATTORNEY Nov. 20, 1956  G. M. SAVAGE  2,771,399
PROCESS AND APPARATUS FOR DETERMINING BIOLOGICAL
POTENCY OF A SUBSTANCE IN A LIQUID SUBSTRATE
Filed Oct. 12, 1954  3 Sheets-Sheet 3
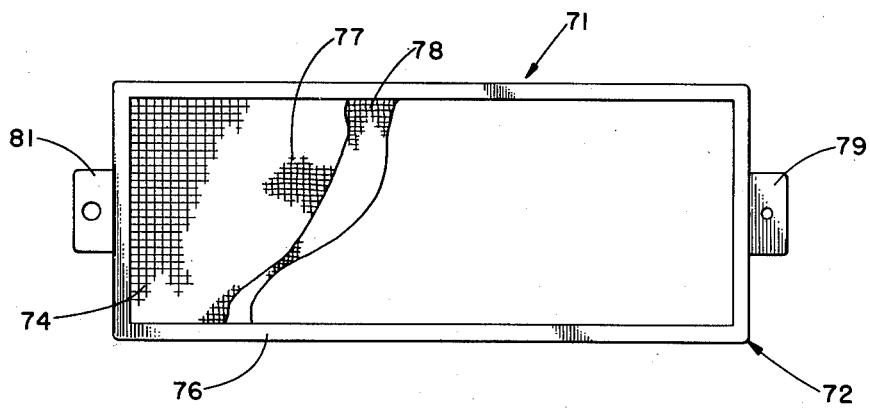
fig. 8
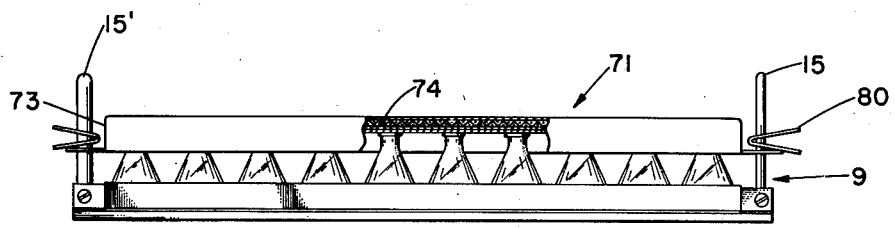
fig. 9
INVENTOR.
GEORGE M. SAVAGE
BY 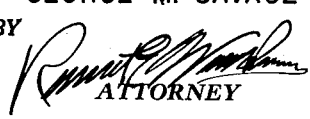
ATTORNEY United States Patent Office 2,771,399
Patented Nov. 20, 1956

2,771,399

PROCESS AND APPARATUS FOR DETERMINING BIOLOGICAL POTENCY OF A SUBSTANCE IN A LIQUID SUBSTRATE

George M. Savage, Kalamazoo, Mich., assignor to The Upjohn Company, Kalamazoo, Mich., a corporation of Michigan Application October 12, 1954, Serial No. 461,864

27 Claims. (Cl. 195—103.5)

This invention relates to a process, and to apparatus for carrying out such process, for determining the potency of liquid media, particularly, the fermentation products of micro-organisms, and it particularly relates to a process for determining the potency of a large number of samples of such media with sufficient rapidity to materially improve research procedures.

It is customary in the art of fermentations to seed various micro-organisms into suitable liquid substrates and permit adequate time for the micro-organisms to convert their respective substrates into desirable fermentation products such as antibiotics and vitamins. Particularly, in the field of antibiotic research, it is desired to investigate the possibilities of antibiotic activity in many thousands of fermentation samples with respect to large numbers of test organisms afflicting and affecting men, animals and plants. It is well known that the assaying involved in the testing each of the many thousands of micro-organisms having possible antibiotic effects with respect to various disease-producing and other harmful bacteria and fungi, involves such a tremendous mass of testing that the speed at which the assaying can be carried out often becomes the principal factor limiting the rate of advancement of an entire program of research.

Similarly the investigation of substances for stimulating the growth of organisms, e. g. vitamins, requires a similarly large quantity of testing operations and accordingly the research operations of this nature may be similarly limited.

In the first stage of antibiotic research, it has long been customary to gather samples of soils from many different sources and to prepare cultures of the micro-organisms found in such samples. These micro-organisms are caused to grow and the cultures are placed in large numbers, often hundreds, of pieces of testing equipment, such as petri dishes, on some form of a nutrient gel. During the period of growth of such micro-organisms, if they have antibiotic capacities, they appear to secrete a material which spreads from its source in the culture medium over an area of the gel substrate in a manner which will inhibit the growth of the test cultures and an observation of the extent to which such growth is inhibited provides preliminary information of antibiotic activity which is of use for initial screening purposes.

However, in present processes for making antibiotic preparations, it is desirable that the micro-organisms used be capable of growth in a liquid substrate. Hence, another screening operation is required in which all of the micro-organisms which successfully pass the first screening operation are given an opportunity to grow in a liquid substrate and are then again tested to determine the extent of their growth and the extent to which they have produced antibiotic materials.

This last-named screening operation is further complicated by the fact that some micro-organisms will successfully produce large quantities of antibiotic material when grown in a liquid substrate of one character but the same micro-organisms may produce little, or substantially no, antibiotic material when grown in a different liquid substrate. Therefore, the further screening operation required involves not only the investigation of how well the micro-organism grows in some particular liquid substrate but it requires the investigation of how well the micro-organisms will grow and produce antibiotics in a variety of different liquid substrates at different temperatures, and at different rates of aeration. This further extends the permutations of the total number of investigations which must be carried out to effect a satisfactory screening operation.

Therefore, it becomes, and has long been, desirable to provide a method, and means for practicing the method, for rapidly investigating the capacity of various selected micro-organisms for growth and the production of antibiotic materials in a plurality of liquid substrates. Such method is intended to provide both qualitative and, in a rough way, quantitative information with respect to each fermented substrate.

Therefore, a principal object of the invention is to provide a process, and apparatus for carrying out the process, for introducing cultures of a micro-organism into a liquid substrate, fermenting same and applying said fermented material to a culture of a test organism in or on a gel substrate in a manner which will secure an estimate of the growth-affecting potency of each fermented material more rapidly than is possible by present practices but without losing the necessary accuracy and uniformity of results.

A further object of the invention is to provide like process and apparatus for assaying the growth-affecting properties of other liquid media.

A further object of the invention is to provide a process, and apparatus for carrying out the process, for introducing a micro-organism into a liquid substrate, fermenting same and applying said fermented material to a culture of a test organism on a gel substrate in a manner which will secure an estimate of antibiotic potency of each fermented material more rapidly than is possible by present practices but without losing the necessary accuracy and uniformity of results.

A further object of the invention is to provide a process for simultaneously applying a plurality of the above mentioned fermented materials or other liquid media onto a gel substrate seeded with a test organism in a manner which will secure rapid, accurate and uniform deposition of the several fermented materials onto said gel substrate.

A further object of the invention is to provide a process, as aforesaid, which will enable an operator to make reasonably reliable quantitative comparisons of the results of placing a micro-organism in one liquid substrate with respect to the results of placing the same micro-organism in a different liquid substrate, the accuracy of such comparison being within the limits required for preliminary screening purposes.

A further object of the invention is to provide a process, and apparatus for carrying out such process, which will handle a plurality of different micro-organisms, as well as each of said organisms in a plurality of different liquid substrates, all at the same time and with respect to a single test organism.

A further object of the invention is to provide a process, and apparatus for carrying out such process, which will handle a plurality of different micro-organisms, as well as each of said organisms in a plurality of different liquid substrates, all at the same time and with respect to a plurality of test organisms.

A further object of the invention is to provide a process, as aforesaid, which can be practiced by relatively simple equipment and to provide such equipment.

A further object of the invention is to provide a process, as aforesaid, which is of sufficient flexibility as to be readily adaptable to a wide variety of requirements in various research operations such as the studies of aeration and temperature effects.

Other objects and purposes of the invention will be apparent to persons acquainted with processes of this general type upon a reading of the following specification and inspection of the accompanying drawings.

In the drawings:

Figure 1 shows a typical device for receiving a plurality of liquid fermented substrates onto a gel base seeded with a test culture.

Figure 2 shows a typical device for applying the plurality of liquid fermented substrates onto a transfer sheet, the illustration being partially in section as indicated in Figure 3.

Figure 3 shows an end view of the device of Figure 2.

Figure 4 shows a sectional detail of a part of Figure 2 on an enlarged scale.

Figure 5 shows the top view of a tray holding the test organisms after applying a plurality of liquid fermented substrates thereto, the broken line circles indicating the positions of the areas contacted by the liquid fermented material.

Figure 6 shows a top view of a tray of Figure 5 and showing the appearance thereof after the elapsing of a period of time as described below.

Figure 7 is a schematic showing of the transfer sheet with reference circles applied thereto.

Figure 8 is a top, partially broken, view of a cover used in the fermentation step of the process portion of the invention.

Figure 9 is a side, partially broken, view of apparatus including said cover which may be used in said fermentation step.

In practicing my process it will be apparent that a large number of specific pieces of apparatus can be used. However, the particular pieces of apparatus illustrated in the drawings, and hereinafter referred to in the description, will be taken as illustrative of certain preferred items of equipment but are by no means limiting.

TERMINOLOGY

Inasmuch as the process is adapted for investigating either the growth stimulating or the growth inhibiting effects of many different types of micro-organisms, such as bacteria and higher fungi, the term "micro-organisms" will be used throughout the following discussion to denote the source of the material being investigated for growth inhibiting or growth stimulating effects and the term will be understood to include any of the various subdivisions thereof.

The term "test organism" will be used to denote the vaious kinds of organisms whose growth is to be stimulated or inhibited by substances secreted by the micro-organisms above mentioned. Particularly, the term "test organisms" will refer to such organisms, and especially bacteria, and higher fungi, which are harmful to mankind, to animals and to plants.

The fermented substrate containing both micro-organisms and antibiotic material, or micro-organisms and vitamins, is in the art often referred to as a "beer" and hence for convenience in reference this term will be freely used hereinafter.

Further, it will be understood that although the process is adaptable to the determination of both growth stimulating and the growth inhibiting characteristics of one organism with respect to another, the primary present commercial adaptation of the process is for the identification of one organism's growth inhibiting function with respect to another organism, and hence the description of the process will proceed in this manner.

While the growth inhibiting functions of the micro-organisms may be applied to any type of test organism, as organisms causing diseases of mankind, animals and plants, there are usually in present commercial practice from ten to thirty test organisms with respect to which the testing of the beers is preferred. Further, while the present principal practice of the process is in the investigation of the antibiotic effect of various substances against bacteria, it will be understood that the growth inhibiting effects of such substances may also be studied as applied to higher fungi and other types of micro-organisms.

APPARATUS

In the practice of the process of the invention, there is first prepared a culture of a test organism on a suitable gel medium, as agar. Said agar, indicated at 1 in Figure 1, is spread in a uniformly thin film upon a flat base 2, as glass, which is held within a metallic, often aluminum, retaining tray 3. The glass base 2 is sealed in grooves in the sides of the retaining tray 3 by a sealing means 3' formed of rubber or other pliable and resilient material. A metallic cover 4 having resilient flanges is provided for covering the top of the tray 3 to complete the box 5. The beer being here studied appears in Figure 1 as a plurality of discontinuous spots formed on the substrate 1 and shown at 7 with exaggerated thickness.

The tray 3 is constructed with its supporting edges in a common plane and with the upper surface of the base 2 parallel to this common plane so that when the tray is supported on a level table, the liquid substrate can be poured on the base to provide a uniformly thin layer of gel substrate over the entire surface of the base. Advantageously this layer can be about one millimeter in thickness. Thicker layers give less sensitive assays and thinner layers are sensitive to dehydrating conditions. In general satisfactory results are obtained with a gel layer between about one and about three millimeters in thickness.

Cultures of the several micro-organisms being investigated are made in various selected liquid substrates and are contained within a plurality of containers 8. As appears in Figure 2, there are in this illustrative embodiment provided ten rows of containers which, for illustrative purposes, may be taken to contain, respectively, ten different types of micro-organisms indicated as interesting by a previous preliminary screening process, and which are to be further investigated by the process herein concerned. As appearing in Figure 3, each of the rows appearing in Figure 2 has four flasks therein, which may be utilized for placing samples of each of the ten test specimens in four different substrates. Alternatively, it will be recognized that the same tray of containers 8 may be utilized for testing samples of twenty different specimens by each being placed in two different substrates and that many other arrangements also will be possible.

Said flasks are held in a tray 9 having a bottom, sides and ends and being of substantially rectangular form. Said tray has endwise extensions 10 and 10' on which are supported upstanding guide pins 15 and 15' of unequal diameters for purposes appearing hereinafter. Each of said extensions includes a block 6 (Figure 3) fastened to the extended ends of the tray base 25 by the angles 24 and 24'. A pair of pins of which one appears at 29, are fixed in a base 11 to assist in positioning the tray 9 properly on said base 11.

Said tray is caused to rest upon the base 11 of inverting mechanism which includes a frame 12 (as in Figure 3) mounted for rigid support in any convenient manner. Said frame 12 supports a bearing 13 which rotatably supports a shaft 14. A backboard 16 is supported on the shaft 14 and in turn supports a bracket 17 and the base 11. Base 11 has a further bracket 18 depending from a point spaced from the backboard and a rotation controlling pin 19 extends through both bracket 18 and the lower end of the backboard 16 and thence extends into a suitable opening in a block 23 mounted on said frame 12. A spring 21 constantly urges the pin 19 rightwardly and a suitable stop 22 limits the extent of such movement. A pressure plate 26 is supported on a screw 27 extending through the bracket 17 and is manually rotated by a crank 28. The tray 9 is substantially centered under the pressure plate 26 by the cooperation of the pins 29 acting on the body of said tray and the pins 15 and 15' acting against the pressure plate 26.

With a plurality of bottles in place on the tray 9, there is placed over the guide pins 15 and 15' a spot-guiding assembly 31 comprising a stiff, as metallic, guide plate 32 and a sealing, as soft rubber, layer 33. This assembly 31 is provided with openings 35 in register, both as to size and location, with the mouths of each of the several containers 8. By having the pins 15 and 15' of unequal sizes, and having the pin receiving openings in the guiding assembly 31 of correspondingly unequal sizes, it is evident that the spot-guiding assembly 31 can be placed with respect to the rest of the apparatus in only a single predetermined position and that inadvertent reversal of the positions of said parts becomes impossible. A sheet 34 of absorbent material, as paper, which is also capable of filtering micro-organisms of the fineness of at least that of the mycelium of filamentous fungi, is placed on top of the plate 32 and a pressure assembly 36 is placed on top of the paper 34 and is likewise received over and guided by the pins 15 and 15'. Said pressure assembly also comprises a relatively stiff, as metal, backing member 37 and a soft and resilient, as rubber, lower layer 38 backing the filter paper 34. The whole unit, comprising the spot-guiding assembly and the pressure assembly, may hereinafter be termed a "sampling top."

PROCESS

In carrying out the process of the invention, a test organism, as Staphylococcus aureus, is prepared and seeded in the gel layer 1. The several containers 8 are then arranged in the tray 9 and the several selected liquid substrates are placed within the respective containers, suitable record being of course made of which particular substrates are in which containers. A suitable bacterial filter, as a cotton and gauze pad, is then placed over the mouth of each of said containers and the tray and containers are placed within a suitable sterilizing autoclave. Advantageously a single sheet of bacterial filter large enough to encompass all of the containers is used. Within said autoclave the containers are subjected to heat of such a level and for such a period of time as is accepted in conventional practice to destroy such, usually all, of the micro-organisms within the several containers as is necessary to meet the purposes of the test. One specific and convenient device for holding the filter medium in place during the fermentation step is set forth in detail hereinafter. The use of the cotton and gauze pad on the top of the several containers is for the same purposes as in present practice, namely, to permit the egress of air from said containers as they are heated, to permit the ingress of air into said containers as they are subsequently cooled only through a filter medium of sufficient effectiveness to minimize the possibility of contamination within said containers and to permit free ingress of sterile air during fermentation.

The tray and containers are then removed from the autoclave, permitted to cool sufficiently to make it possible to handle them, the filter media removed from above the several containers, the micro-organisms to be investigated placed respectively in the several containers and the filter pad then replaced. The several containers should be uncovered for as brief an interval as possible in order to continue to minimize the possibility of contamination of said containers by micro-organisms of other than the one being investigated in connection with the substrate within a particular container.

The containers are then placed under such conditions of temperature and humidity as to promote the growth of the micro-organisms in the several containers and they are often subjected to moderate agitation, as by shaking. This is continued for a period of time, usually a few days, sufficient to permit the micro-organisms to develop within the liquid substrate whatever antibiotic material they may be able to develop in the particular environment existing within a given container. The several container now each contain a fermeneed liquid substrate containing micro-organisms and, perhaps, also containing an antibiotic material. The rest of the procedure is now directed toward determining whether such antibiotic material exists with respect to each of the respective containers and, if it does, something of its characteristics.

The filter pads or plugs are first removed, and the tray 9 is then placed on the base 11, between the pins 15 and 15' and against the pins 29, a sterile sampling top put into position and the pressure plate 26 screwed down against the upper surface of the pressure assembly 36. With the whole asembly thus held firmly together, the pin 19 is manually retracted and the device rotated around the axis of shaft 14 into an inverted position. This permits each beer in its respective container 8 to pass through its respective opening 35 above each said container 8 and to impregnate the absorbent transfer sheet 34. The period of such impregnation will be determined according to the amount of time that is required to secure the desired degree of impregnation. In one present commercial use of the process, 12 seconds appears to be sufficient. In some instances it has been found desirable to print on the absorbent sheet 34 circles 39 (Figure 7) of water impervious material for the purpose of blocking, or at least partially blocking, the spread of material from the several containers 8 beyond the area marked by each of said circles. This further improves the accuracy of the process from a quantitive point of view.

After the desired period of impregnation has elasped, the inverting mechanism is then returned into an upright position located by pin 19 and the clamping plate 26 is loosened by retraction of the screw 27. The pressure assembly 36 is then removed and the impregnated transfer sheet 34 is lifted from the plate 32, inverted, and laid against the agar substrate 1. By inverting the transfer sheet as it is laid against the agar substrate, the several deposits onto the transfer sheet of beers from within the several containers are on the upper side of the transfer sheet. Thus, as the liquid material passes through the transfer sheet the micro-organisms and other solid material which may be within the beer will be filtered out and only the liquid portion thereof will contact the agar. This insures that the reaction of the test organisms on the agar to any antibotic material which may be in the beer will be uncontaminated by the presence of the original micro-organisms or other solid material which may have formed within the respective beers. The several spots 7 of beer deposited from the several containers 8 onto the sheet 34 are then transferred to the agar layer 1 and form a series of similar spots 7 thereon, each spot containing a quantity of material respectively from the several containers 8.

The container 5 is then subjected to suitable conditions of temperature and humidity for promoting the growth of the several test organisms in their agar. After the elapsing of a selected period of time, the container 5 is examined and the zones of inhibition of the test organisms are noted. Thus, where the beer from a given one of the containers 8 has no antibiotic effect at all, there will be no inhibition at all of the test organism in the layer 1 and, for example, the site 51 indicated in Figure 6 by a broken line, corresponding to the spot 51a on the sheet 34 (Figure 7) will present essentially the same appearance as the portions of the layer 1 immediately adjacent thereto. However, another site corresponding to the spot 52a on the sheet 34 will show a zone of inhibition 52 if the beer applied to the spot 52a has an antibiotic effect with respect to the test organism in the layer 1. This zone of inhibition will be rendered discernible by the lessening of growth of said test organism in the layer 1 as observed by any appropriate technique.

It will be apparent that the several zones of inhibition will be large or small, or nonexistent, depending upon the amount of antibiotic capacity in each of the respective beers from the several containers 8 and the size of the respective zones of inhibition will indicate both qualitatively and quantitatively the amount of antibiosis effected by the beer in each of the several containers 8. Thus, in Figure 6 is it shown that spot 51a has no antibiotic effect whatever but that spot 52a had a moderate antibiotic effect as shown by zone 52. Further, spots 53a, 54a and 55a had a very substantial antibiotic effect as shown by zones 53, 54 and 55, but spot 56a had only a minor antibiotic effect as shown by zone 56. All of the spots appearing in the several columns 57a 58a, 59a, 60a and 61a had no antibiotic effect whatever as shown by the absence of zones of inhibition, but the column 62a had a moderate antibiotic effect in which each of the several spots within the column produced a susbtantially equal sized zone of inhibition as shown at 62. Assuming that all of the containers forming said spots in column 62 had been seeded with the same micro-organism but in different substrates, this would indicate that, in this case, the micro-organism produced its antibiotic substantially equally well in each substrate.

The circles 39 of moisture impervious material placed onto the sheet 34 are preferably of a material which is inert to the antibiotic involved in the several containers 8 and also inert to the test organisms in the agar layer 1. Suitable materials includes waxes, vegetable and mineral oils, resins and the like. More specifically, ordinary oil based or resin based printing inks may be used, such as "Wotta Black," an alkyd resin base printing ink marketed by E. J. Kelly Company, Kalamazoo, Michigan. It is normally sufficient for such material to be impressed upon one side only of the sheet 34, but in cases where the beer is of particularly penetrating character, it may be desirable to apply such diffusion limiting circle to both sides of the sheet 34.

The following examples will serve to further illustrate the process of the invention.

Example 1

A group of forty actinomycete cultures, having been isolated from a soil source, and having passed a previous screening procedure which gave some indication that these cultures might be capable of antibiotic production, were seeded separately into each of forty wide-mouth Erlenmeyer-type flasks of 50 ml. capacity, under aseptic conditions. Each flask contained 10 ml. of a liquid substrate which, by prior knowledge, was known to be suitable for the production of a multiplicity of antibiotics. The forty flasks had been previously arranged in the type of "spot-splash" tray shown in Figures 2 and 3, had been individually filled with 10 ml. of liquid substrate and each row of 4 flasks had been covered with a seeding shield. This assembly, having been previously sterilized by exposure to steam at 120° C. for thirty minutes, and having cooled, was in proper condition for seeding with the actinomycete cultures mentioned above.

Flasks were seeded in groups of four to minimize the probability of contamination. Each seeding shield provided protection for the covered flasks in each group while an uncovered flask was being seeded.

Seeding having been accomplished, the ten seeding shields were quickly removed and a blanket of sterile cotton and gauze, commonly used to protect equipment from contamination while permitting entrance of air to said equipment, was placed over the flasks. This blanket was securely held to a stainless steel screen which in turn was welded into a stainless steel frame to make a so-called "fermentation top" (Figure 8). With this fermentation top in place the tray of 40 flasks was shaken vigorously on a reciprocating shaker at 94 oscillations per minute for a period of five days at a temperature of 28° C.

On the fifth day of the fermentation period, the tray of flasks was removed from the shaker for determination of antibiotic potency in the forty fermented substrates (beers). Whereas individual sampling and record keeping of each sample would be required, and for each test organism to be studied, as commonly done in the art prior to this invention, said determination of potency was done as follows:

Having removed the fermentation top aseptically, and in an essentially sterile atmosphere, I placed the spot-guiding assembly (parts 32 and 33 in Figure 4) upon the forty flasks, dropping said assembly over the alignment pins (15 and 15' in Figure 2) to assure proper alignment of the forty holes with the forty flasks. Next I placed a sheet of sterile filter paper (34 in Figure 4) containing 40 imprinted circles, each in such a position as to restrain the movement of a small volume of beer to a circular area, each of identical size. Next I dropped the pressure assembly (parts 36 and 38 in Figure 4) into place over the guide pins.

All parts being in place, the tray and sampling top were set into the invertible platform and clamped securely in place by compression (plate 26 in Figure 2). Releasing the securing pin (19 in Figure 3) I inverted the entire tray and contents for a period of approximately five seconds, during which time a volume of approximately 0.5 ml. of beer from each flask ran through the corresponding hole in the spot-guiding assembly and was deposited in its respective circumscribed circular area in the filter paper. The tray and sampling top were then re-inverted, after which I removed the pressure assembly, lifted off the sheet of filter paper and transferred it to a sheet of agar in a sterile tray, as shown diagrammatically in Figures 5 and 6. The agar had previously been seeded with a measured population of *Klebsiella pneumoniae*, which is a bacterium pathogenic for man. After 20 minutes for diffusion into agar of any antibiotic present in the beer samples, I removed the filter paper, covered the agar tray and incubated it overnight at 37° C. The next morning, I observed that certain of the circular area showed inhibition of the growth of *Klebsiella pneumoniae* as shown in Figure 6, thus indicating the presence of an antibiotic active against *Klebsiella pneumoniae*.

Following this, I repeated the above operation six more times, each time placing a strip of filter paper on an agar film seeded with a different test bacterium, namely, *Mycobacterium avium*, *Staphylococcus aureus*, *Escherichia coli*, *Proteus vulgaris*, *Pseudomonas aeruginosa* and *Bacillus subtilis*. All of these test organisms are either pathogenic to man or closely related to bacteria which are pathogenic to man. In this way, I successfully determined whether any antibiotic was present in forty beers, which might be active against any one or more of the above seven test organisms, for a total of two hundred and eighty such determinations.

It would be common practice in the art to require at least four man hours of research time to make the above determinations. By the process of my invention I was able to carry out the two hundred and eighty determinations in approximately thirty man minutes. In addition to the time saved, I was able to be assured of no errors in the results observed, which frequently is the case when so many determinations are done at one time by other methods.

Example 2

The operation above described was repeated with the oscillating of the tray of flasks occurring at a temperature of 24° C. Upon completion of the investigating steps described above subsequent to the oscillating operation, clear information was obtained of the effect on antibiotic production of effecting the fermentation at the temperature of 24° C. instead of 28° C. as used previously.

Example 3

The operation above described in Example 1 was repeated with the oscillating of the tray of flasks occurring at a temperature of 32° C. Upon completion of the investigating steps described above subsequent to the oscillating operation, clear evidence was obtained of the effect on antibiotic production of effecting the fermentation at the temperature of 32° C. instead of 28° C. as used previously.

Example 4

The fermentation operation in each of the three preceeding examples was continued beyond the five days mentioned above and further samples taken and investigated for antibiotic potency from time to time during the sixth and seventh days of fermentation. Determination of these results provided further information concerning the antibiotic production obtained by fermentation for periods of time other than the five days mentioned in connection with Examples 1, 2 and 3 and, again, the desired information was satisfactorily obtained within a small fraction of the time which would have been required for assaying by conventional methods.

Example 5

After identifying a group of antibiotic-producing actinomycetes by the processes described in Examples 1 to 4 above, it was next desired to determine the effect of culturing these several actinomycetes in each of several different commonly known culture media. Accordingly, the operations described above in Examples 1 to 4 inclusive were repeated by arranging the 40 flasks so that 10 of the interesting antibiotic-producing actinomycetes were placed therein in each of four different culture media. The fermentation was then carried out and the antibiotic potency of the resulting antibiotic material, if any, present in each fermented liquid substrate was determined in the manner above set forth. Thereby, I was able to ascertain which of the four culture media was most desirable for the production of antibiotics through the agency of each of the 10 actinomycetes and such determination was carried out quickly and accurately.

Example 6

Having selected four antibiotic-producing actinomycetes by the methods of the preceding examples, it then became desirable to investigate a larger number of culture media. Accordingly, four selected actinomycetes were cultured in 10 different culture media of varying degrees of cost, for the purpose of determining which culture medium could most advantageously be cultured through the most economical procedure. Again, satisfactorily accurate results for preliminary screening purposes were obtained quickly and accurately.

Example 7

It was desirable to know at what temperature an antibiotic was best produced. Triplicate sets of trays set up as in Example 1 were fermented at three different temperatures, viz. 24° C., 28° C. and 32° C. By the techniques described in Example 1, the optimum temperature was determined for each particular culture on each of ten different media.

Example 8

At another time I wished to know at what aeration rate, as a function of rotational speed of a rotary shaker, antibiotic production was the greatest. Triplicate sets of trays were set up and fermented at each of three different rotational speeds. In this way I was able to ascertain the approximate aeration rate which was optimal for the production of a given antibiotic in each of a number of different culture media, at a certain temperature.

While within the broad process of this invention, the fermentation step may be carried out in any convenient type of fermentation apparatus, it is particularly advantageously carried out by a device as shown in Figures 8 and 9 of the drawings. In this device, the tray 9 is the same tray as that illustrated in Figure 2 and by the use of which the flasks are inverted. Here, however, in place of the sampling top including the spot-guiding assembly 31, there is provided a fermentation cover 71. Said fermentation cover comprises a peripheral frame member 72 having an upstanding rim 73 and a flange 76. A panel 74 of foraminous material, such as a stainless steel screen, is positioned within said rim and against said flange, where it may be held by soldering or welding or merely frictionally. A plurality of layers of bacterial filter material, as sterilized cotton gauze, are placed against said foraminous panel 74 as indicated at 77 and 78. These layers of cloth are in turn held in position by sewing or otherwise fastening them to the panel 74.

A pair of tabs 79 and 81 correspond to the guides 36 of the sampling top shown in Figure 2 and extend from the ends of the casing 72. Said tabs are provided with openings therethrough of such size as to receive the pins 15 and 15' therethrough for guiding said cover into place with respect to the flasks and holding same against lateral displacement. A clamp 80, such as any common spring-clamp, may be provided at each end of the cover to hold the fermentation cover in position as shown in Figure 9, or the weight of said cover may be relied upon for this purpose. In either event, said cover together with the tray 9 and its pins 15 and 15' form a highly advantageous fermentation unit which is very conducive to the accurate and rapid effecting of the fermentation operations described above.

While throughout the foregoing description, it has been assumed that the seeding of the agar substrate has been completed prior to the application of the beers thereto, it will be recognized that under some circumstances it may be advantageous, and within the scope of the present invention, to apply the beers to the agar substrate prior to the seeding of the test organism thereon.

It will be apparent also that while aqueous solutions have been assumed throughout as indicating the character of the liquid substrate, this is by way of example only and that other types of liquids suitable for the growth of a desired micro-organism may in some instances be utilized without departing from the scope of the invention. It will be apparent also that in a like manner other liquid media, such as solutions of synthetic chemicals, can also be assayed for growth-affecting properties with respect to other test organisms.

The process of the invention can also be carried out without the use of the circles 39 but since the absence of such circles may permit the antibiotic carrying liquid to spread irregularly, the consequent variation in size of spots of inhibition on the agar layer 1 will make the data less useful. This test will then provide only qualitative information and not quantitative.

Although an agar culture has been assumed throughout as the culture used within the container 5, it will be apparent that this is illustrative only and that any culture medium suitable for a particular test organism may be employed within the scope of the invention.

I claim:

1. A process for determining the growth-affecting potency of a plurality of liquid media with respect to a selected test organism comprising the steps: arranging said liquid media in a plurality of separate containers, simultaneously transferring equal quantities of liquid media from said plurality of containers to a transfer media and then depositing same from said transfer media in a predetermined pattern on a solid substrate seeded with said test organism and then subjecting said solid substrate to conditions favorable to the growth of said test organism.

2. A process for determining the growth-affecting potency of a plurality of liquid media including a fermented material with respect to a selected test organism comprising the steps: arranging said liquid media in a plurality of separate containers, simultaneously transferring equal quantities of fermented material from said plurality of containers respectively to a transfer media and then depositing same from said transfer media in a predetermined pattern on a solid substrate and then subjecting said solid substrate with said test organism uniformly seeded thereon to conditions favorable to the growth of said test organism.

3. The process of determining the growth-affecting potency of elaboration products of micro-organisms with respect to a selected test organism, comprising the steps: growing cultures of at least one type of said micro-organisms in separate quantities of liquid substrate, and retaining each of said cultures as a fermented substrate respectively in a plurality of separate containers, simultaneously transferring equal quantities of liquid substrate from said plurality of containers to a transfer media and then depositing same from said transfer media in a predetermined pattern on a solid substrate seeded with said test organism and then subjecting said solid substrate to conditions favorable to the growth of said test organism.

4. A process for determining the growth-affecting potency of a plurality of liquid media with respect to a selected test organism comprising the steps: arranging said liquid media in a plurality of separate containers, simultaneously transferring equal quantities of liquid media from said plurality of containers, depositing same in a predetermined pattern on a transfer sheet, then contacting said transfer sheet with a solid substrate, seeding said substrate with said test organism, and then subjecting said substrate to conditions favorable to the growth of said test organism.

5. A process for determining the growth-affecting potency of a plurality of liquid media with respect to a selected test organism comprising the steps: arranging said liquid media in a plurality of separate containers, closing each container except for a sampling hole, closing all of the sampling holes with a transfer sheet, simultaneously inverting all of said containers whereby said liquid media flow through said sampling holes to said transfer sheet, simultaneously righting said containers, removing said transfer sheet, then contacting said transfer sheet with a solid substrate, and then subjecting said substrate seeded with said test organism to conditions favorable to the growth of said test organism.

6. The process of determining the growth-affecting potency of elaboration products of micro-organisms with respect to a selected test organism, comprising the steps: growing cultures of at least one type of said micro-organisms in separate quantities of liquid substrate, and retaining each of said cultures as a fermented substrate respectively in a plurality of separate containers; seeding a culture of said selected test organism in a gel substrate; simultaneously transferring from said first group of containers to said gel substrate substantially equal quantities of said respective quantities of fermented substrate and depositing same in a predetermined pattern on said gel substrate; subjecting said gel substrate and the test organisms carried therein to conditions favorable for the occurrence of growth of said test organism; and measuring the extent to which growth of said test organism has been affected.

7. The process of determining the growth-affecting potency of elaboration products of micro-organisms with respect to a selected test organism, comprising the steps: growing cultures of at least one type of said micro-organisms in separate substrates, and retaining each of said cultures as a fermented substrate respectively in a plurality of separate containers; seeding a culture of said selected test organisms in a gel substrate; applying equal quantities of said respective fermented substrates to a transfer sheet and then utilizing said transfer sheet to apply said quantities of fermented substrate to said gel substrate and for depositing same in a predetermined pattern on said gel substrate; subjecting said gel substrate and the test organisms carried therein to conditions favorable for the growth of said test organism; and measuring the extent to which growth of said test organism has been affected.

8. The process of determining the growth-affecting potency of micro-organisms with respect to a selected test organism, comprising the steps: growing cultures of said micro-organisms in separate liquid substrates and retaining each of said cultures as a fermented substrate respectively in a plurality of separate containers; seeding a culture of said selected test organism in a gel substrate; applying equal quantities of said respective fermented substrates to a transfer sheet and then utilizing said transfer sheet both to filter from said fermented substrate substantially all solid material of the size of, and including, any mycelium therein as well as larger solid particles and to apply the filtered substrate to said gel substrate and for depositing same in a predetermined pattern on said gel substrate; subjecting said gel substrate and the test organisms carried therein to conditions favorable for the growth of said test organism; and measuring the extent to which growth of said test organism has been affected.

9. The process of determining the antibiotic-producing potency of a plurality of micro-organisms with respect to a selected test organism, comprising the steps: growing cultures of said micro-organisms in a liquid substrate and retaining each of said cultures as a fermented substrate respectively in a plurality of separate containers; seeding a culture of said selected test organism on a gel substrate; placing an absorbent transfer sheet across the tops of the several said containers and simultaneously inverting all of said containers and said sheet as a single unit for a predetermined period of time, thereupon restoring said unit to its original upright position; utilizing said absorbent sheet both to filter and to transfer said fermented liquid substrates to said gel substrate and for depositing same in a predetermined pattern on said gel substrate; subjecting said gel substrate and the fermented liquid substrates carried thereon to conditions favorable for the growth of said test organisms; and measuring the extent to which growth of said test organisms has been inhibited.

10. The process of claim 7 wherein all of the areas of said transfer sheet absorbing the respective test organisms are held to substantially the same size.

11. A process for culturing micro-organisms and determining their ability to produce growth-affecting substances which comprise filling a plurality of open mouthed containers with liquid substrate, inoculating the liquid substrate in each container with a micro-organism, arranging said containers in a predetermined pattern with their open mouths substantially in a common horizontal plane, placing a sheet of bacterial filter material over the open mouths of said containers, holding the open mouths thus covered with bacterial filter against a foraminous fermentation cover plate thereby forming a unit comprising a plurality of said containers, and subjecting said unit to conditions favorable to the growth of said micro-organisms.

12. A process for culturing micro-organisms and determining their ability to produce growth-affecting substances which comprise filling a plurality of open mouthed containers with liquid substrate, inoculating the liquid substrate in each container with a micro-organism, arranging said containers in a predetermined pattern with their open mouths substantially in a common horizontal plane, placing a sheet of bacterial filter material over the open mouths of said containers, clamping the open mouths thus covered with bacterial filter against a foraminous fermentation cover plate thereby forming a unit comprising a plurality of said containers, and subjecting said unit to conditions favorable to the growth of said micro-organism, replacing the bacterial filter and foraminous cover plate with a sampling cover plate having a sampling opening in register with the open mouths of said containers and gasket means for otherwise sealing said open mouths, clamping a transfer sheet to said sampling cover plate, and temporarily inverting the unit thus formed whereby liquid from said containers is brought into contact with said transfer sheet through said sampling openings, then contacting said transfer sheet with a solid substrate, seeding said substrate with said test organism, and then subjecting said substrate to conditions favorable to the growth of said test organism.

13. A fermentation device for subjecting a plurality of containers to conditions for promoting the fermentation of material within said containers, the combination comprising: a tray, said tray having a pair of upwardly extending guides associated therewith; a cover cooperating with said guides for permitting movement of said cover toward and away from, but preventing said movement transversely with respect to said tray, said cover having an open portion therein and a bacterial filter medium extending across said open portion.

14. In a device for subjecting materials to treatment, the combination: tray means for holding a plurality of open mouth containers with their mouths in a common plane; a foraminous panel contacting the mouths of said containers with a foramen in register with the mouths of each of said containers respectively; and a cover holding said foraminous panel snugly against said containers.

15. In a device for subjecting materials to treatment, the combination; tray means for holding a plurality of open mouth containers with their mouths in a common plane; a foraminous panel contacting the mouths of said containers with a foramen in register with the mouths of each of said containers respectively; and a cover holding said foraminous panel snugly against said containers, said tray means having a pair of parallel pins at spaced points thereon and extending parallel to the axes of said containers and said cover having guides slidably engaging said pins, and means holding said cover in a selected position on said pins.

16. Material treating apparatus comprising; a tray having a body part for holding a plurality of open mouthed containers therein in a predetermined relation with their open mouths substantially in a common horizontal plane, a resilient gasket arranged around the mouths of each container, and a foraminous cover plate for clamping said gasket into a tight sealing relationship around the mouth of each container with at least one opening of said cover plate in registry with the mouth of each of said respective containers.

17. The apparatus of claim 16 in which the resilient gasket is a bacterial filter.

18. The apparatus of claim 16 in which the resilient gasket is made of impervious material having a foramen in register with the mouth of each container and with a foramen in the cover plate.

19. The apparatus of claim 16 comprising a second cover plate substantially co-extensive with the first cover plate, and means for clamping a sampling sheet between said cover plates whereby when the apparatus is inverted, liquid contained in said container is brought into contact with said sampling sheet in a pattern corresponding to the predetermined arrangement of said containers.

20. In a device for inverting a plurality of liquid carrying containers simultaneously onto a sheet, the combination comprising: a base member; a horizontal shaft extending from said base member; a backboard supported on said shaft and rotatably related to said base member; a bottom platform extending from said backboard at the lower end thereof; a member extending from said backboard in the same direction as said platform and spaced therefrom, a pressure plate and means supporting said pressure plate at adjustable distances from said platform.

21. In a device for inverting a plurality of liquid carrying containers simultaneously onto an absorbent sheet, the combination comprising: a base member; a horizontal shaft extending from said base member; a backboard supported on said shaft and rotatably related to said base member; a bottom platform extending from said backboard at the lower end thereof and a pair of upright positioning pins extending upwardly from each end respectively of said bottom platform; a tray for holding said containers on said platform; a member extending from said backboard in the same direction as said platform and spaced therefrom, a pressure plate and means supporting said pressure plate at adjustable distances from said platform.

22. The apparatus defined in claim 20 including also a guide plate receivable over said positioning pins and having a plurality of openings therethrough in a selected pattern such that said openings will coincide with the mouths of said containers and a backing member also receivable over said positioning pins for holding said absorbent sheet between itself and said guide plate.

23. The apparatus defined in claim 21 including also a guide plate receivable over said positioning pins and having a plurality of openings therethrough in a selected pattern such that said openings will coincide with the mouths of said containers and backing means also receivable over said positioning pins for holding said absorbent sheet between itself and said guide sheet; said absorbent sheet having a plurality of closed geometric figures marked thereon, said figures being arranged in the same pattern as, and in concentric register with, the openings in said guide plate and said figures being so marked by a material which is impervious to the liquid carried in said containers.

24. A device for making agar plate assays which comprises a metallic tray provided with a removable metal cover and a glass base having a flat upper surface, and being sealed in grooves in the sides of said tray by means of a pliable, resilient sealing material, the supporting edges of said tray being located in a common plane and said glass base being arranged with its upper flat surface parallel to said common plane.

25. The apparatus of claim 24 in which the upper flat surface of the glass base is coated with a uniformly thin layer of gel substrate.

26. A process for determining the growth-affecting potency of a plurality of liquid media with respect to a selected test organism, comprising the steps: simultaneously depositing substantially equal quantities of said liquid media onto a transfer sheet and confining each media in a predetermined region on said sheet; placing said sheet on a solid substrate seeded with said test organism, with said predetermined regions thereof contacting predetermined areas of said substrate; subjecting said substrate to conditions favorable to the growth of said test organism and then measuring the effect of said liquid media on the growth of said test organism by comparing the growth of said test organism in said predetermined areas with the growth of said test organism in the remainder of said substrate.

27. A process for determining the antibiotic potency of a plurality of liquid media produced by culturing microorganisms in a liquid substrate, comprising the steps: simultaneously depositing substantially equal quantities of said liquid media onto one side of a transfer sheet and confining each media in a predetermined region on said sheet; separating the micro-organisms and other solid materials present in said media from said media by inverting said sheet and placing said sheet on a solid substrate seeded with a test organism, with said predetermined regions of said sheet contacting predetermined areas of said substrate; subjecting said substrate to conditions favorable to the growth of said test organism and then measuring the effect of said liquid media on the growth of said test organism by comparing the growth of said test organism in said predetermined areas with the growth of said test organism in the remainder of said substrate.

References Cited in the file of this patent

UNITED STATES PATENTS

| | | |
|---|---|---|
| 768,605 | Keller et al. | Aug. 30, 1904 |
| 1,606,400 | Cheney | Nov. 9, 1926 |
| 2,533,089 | Brewer | Dec. 5, 1950 |
| 2,644,743 | Clevenger | July 7, 1953 |

OTHER REFERENCES

Defco Manual, 9th ed., 1953, pages 335–336.

De Beer et al., Jour. Bact., October 1945, pages 459–467.